(12) United States Patent
Sanchez et al.

(10) Patent No.: US 6,467,587 B2
(45) Date of Patent: Oct. 22, 2002

(54) ENERGY ABSORBING SHOCK MECHANISM FOR REDUCING IMPACT AND ROTARY ACTUATOR INCORPORATING SAME

(75) Inventors: George Sanchez, Fort Collins, CO (US); Henri A. Siedow, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 6 days.

(21) Appl. No.: 09/793,151

(22) Filed: Feb. 26, 2001

(65) Prior Publication Data
US 2002/0117365 A1 Aug. 29, 2002

(51) Int. Cl.[7] .................................................. B60T 8/72
(52) U.S. Cl. ..................... 188/181 A; 267/153; 464/180
(58) Field of Search ............................. 188/181 A, 189, 188/158, 161, 162, 163, 4 B, 67; 267/140, 152, 153, 182; 464/11, 51, 180

(56) References Cited

U.S. PATENT DOCUMENTS 5,159,166 A * 10/1992 Arnosti et al. .......... 192/107 R
6,079,210 A * 6/2000 Pintauro et al. ....... 123/568.21
6,206,739 B1 * 3/2001 Dadd et al. .................... 440/75

FOREIGN PATENT DOCUMENTS

JP          9-53606 A    * 2/1997

* cited by examiner

*Primary Examiner*—Pam Rodriguez
(74) *Attorney, Agent, or Firm*—Leydig, Voit & Mayer, Ltd.

(57) ABSTRACT

A shock absorber for a shaft. The shock absorber comprises a collar having an opening receiving the shaft. A clearance gap is defined between the collar opening and the shaft. A pin offset from the axis connects the collar to a shoulder on the shaft. A resilient o-ring arranged in the clearance gap engages the collar and the shaft. In operation, the collar and the shaft rotate in unison. However, when the collar accelerates or comes to a sudden stop, the resilient o-ring compresses to provide the shock absorption. The shock absorber may be incorporated into a rotary actuator. In a rotary actuator, the collar includes a stop tab that rotates between two stop surfaces of the actuator housing. When the stop tab strikes one of the stop surfaces, the resilient member compresses thereby absorbing and reducing impact force. Compression in the resilient member is snubbed via mechanical stops.

32 Claims, 5 Drawing Sheets

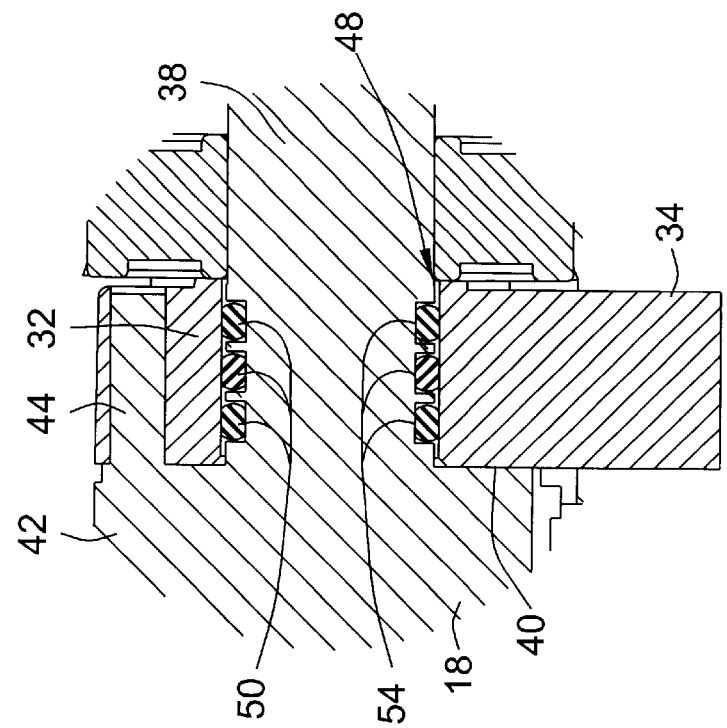
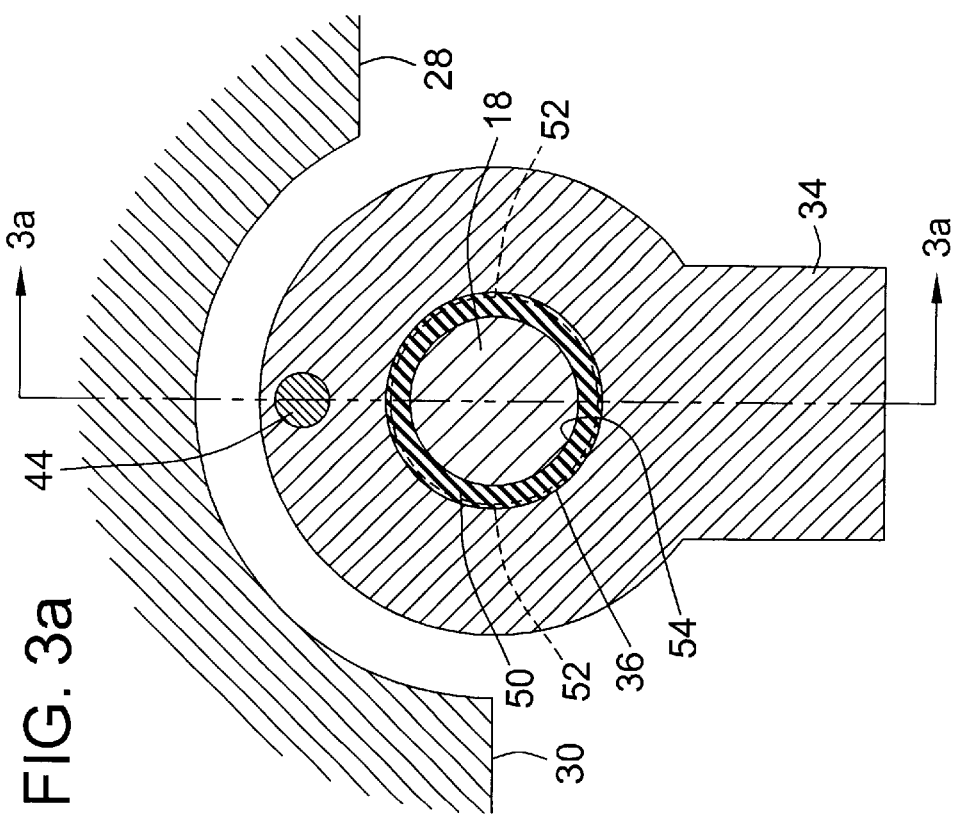
FIG. 3a
FIG. 3b

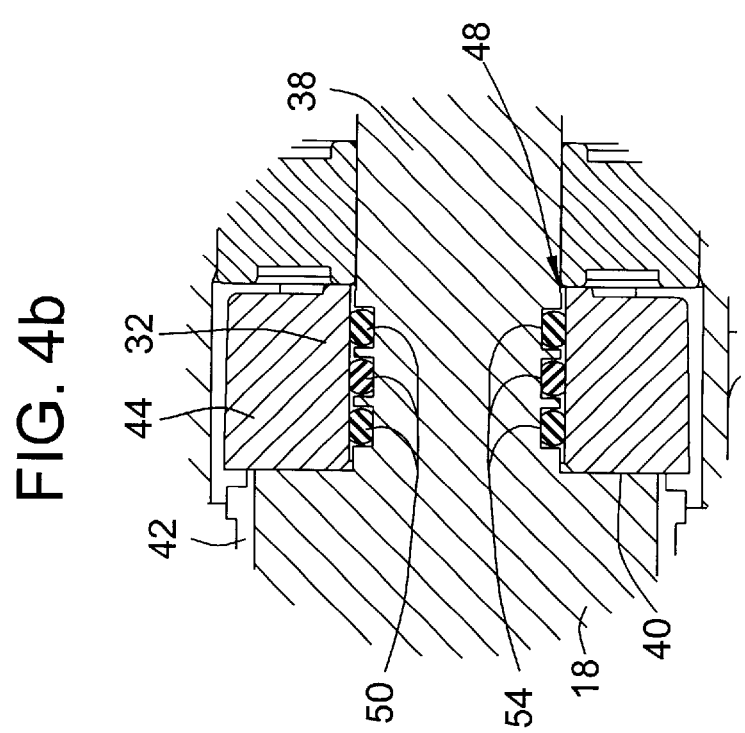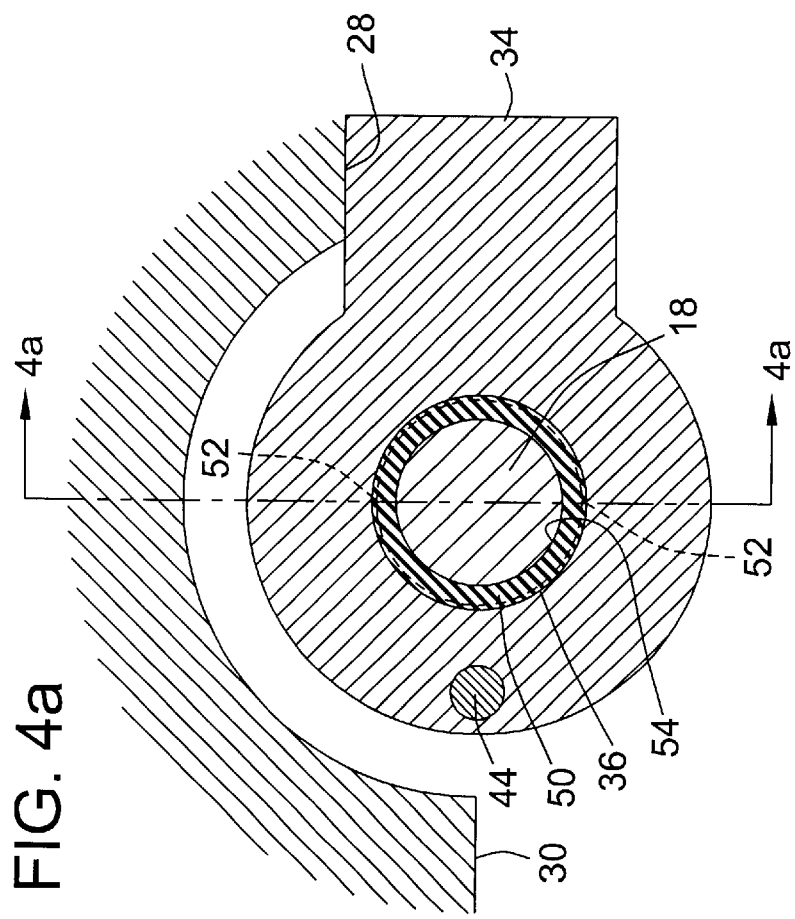

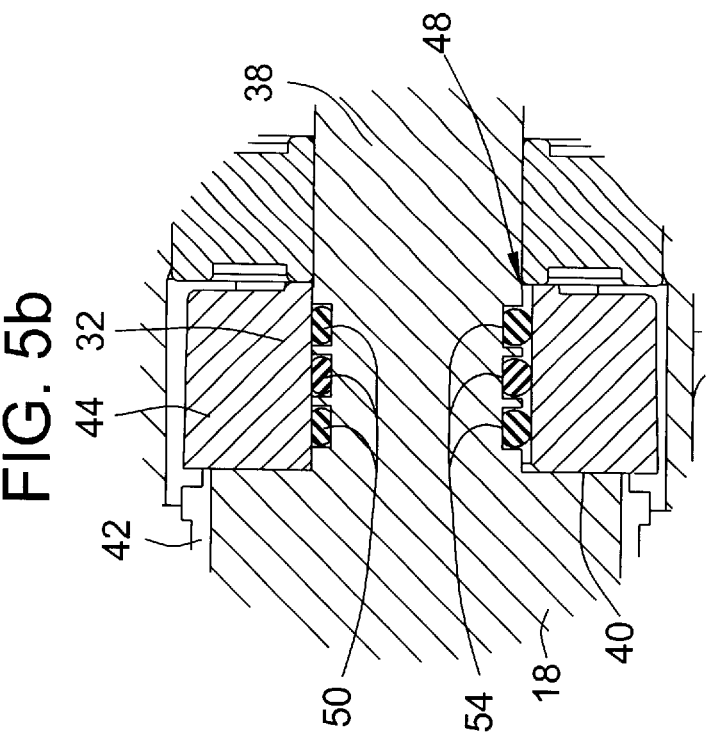
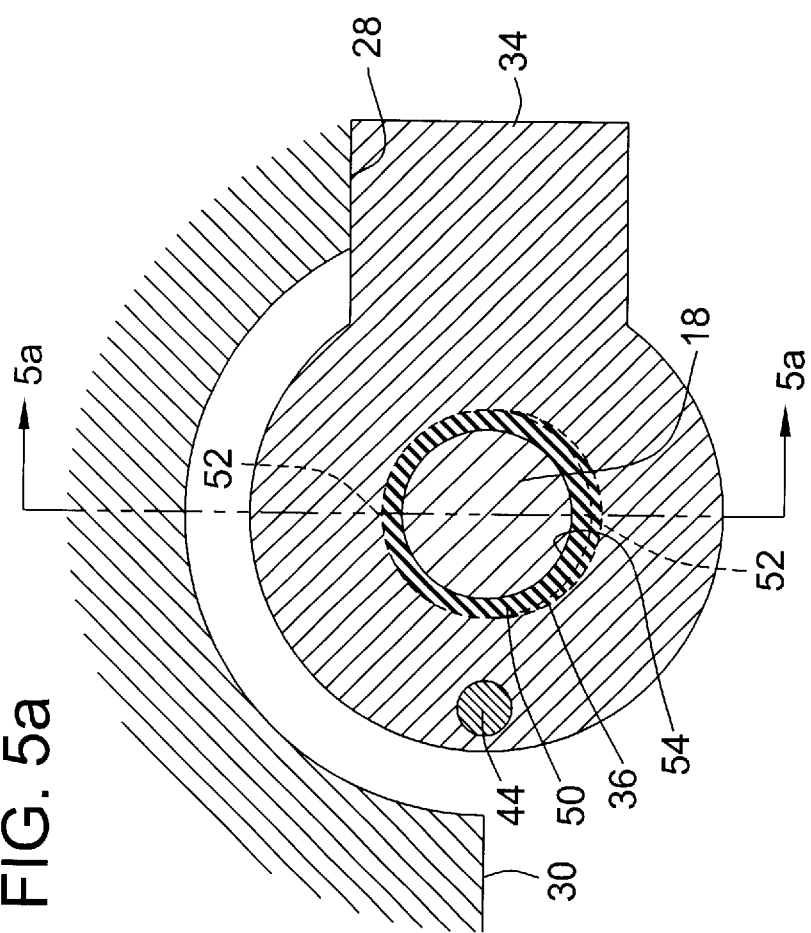

ENERGY ABSORBING SHOCK MECHANISM FOR REDUCING IMPACT AND ROTARY ACTUATOR INCORPORATING SAME

FIELD OF THE INVENTION

The present invention generally relates to shock absorber mechanisms for rotary applications and more particularly to shock absorber mechanisms suitable for rotary actuators.

BACKGROUND OF THE INVENTION

Quickly stopping the rotation in a rotating machine can create large impact loads which can cause part distortion and stress failures. Repetitive smaller impact loads can also cause similar problems. Stress failures can lead to a break down in the rotating machine. Part distortion can lead to inaccurate control and inefficiencies.

One such rotating machine where this is a problem is in variable position rotary actuators. Variable position rotary actuators typically rotate a shaft between two angular positions (and discrete angular positions therebetween in some actuators) for a wide variety of purposes such as controlling the degree of opening of a butterfly valve for example. In such applications, it is often desired to have quick acceleration and high velocity such that the actuator can respond quickly to demands. To properly stop the shaft at the ends of the oscillating movement, mechanical stops are often used to stop the rotation. Such speed requirements and stopping requirements are not easily reconciled and cause significant impact loads. Overtime, these impact loads can cause stress failures or part distortion both of which are undesirable.

SUMMARY OF THE INVENTION

In view of the foregoing, it is an object of the present invention to provide a practical way to reduce impact in rotating machines.

It is a further object in this regard to improve the accuracy of such rotating machines, particularly over time.

It is an object of the present invention according to one important aspect to provide for impact reduction in rotary actuators that rotate a shaft between two angular positions and various discrete positions therebetween if desired.

In accordance with these and other objectives, the present invention comprises a shock absorber mechanism for a shaft having an axis of rotation. A shoulder is provided on the shaft for support of the shock absorber. The shock absorber further comprises a collar having an opening receiving the shaft. A clearance gap is defined between the collar opening and the shaft. A pin offset from the axis connects the collar to the shoulder. At least one resilient member arranged in the gap engages the collar and the shaft. In operation, the collar and the shaft rotate in unison. However, when one of the collar and the shaft accelerates relative to the other (such as to come to a sudden stop), the resilient member compresses to thereby to provide the shock absorption.

It is an aspect of the present invention that the shock absorber mechanism is incorporated into a rotary actuator. The shaft carries the actuator output. The collar includes a stop tab that has an oscillating travel path between two stop surfaces of the actuator housing. When the stop tab strikes one of the stop surfaces, the resilient member compresses thereby absorbing and reducing impact force.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3a is an enlarged cross section of the rotary actuator taken about line 3a—3a in FIG. 2.

FIG. 4a is the same cross section as FIG. 3a but with rotary actuator in a different position.

FIG. 5a is the same cross section as FIG. 4a but with rotary actuator in a different position and the shock absorber mechanism in the act of absorbing impact load.

FIGS. 3b–5b are cross section of FIGS. 3a—5a taken about 3a—3a; 4a—4a; and 5a—5a; respectively.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
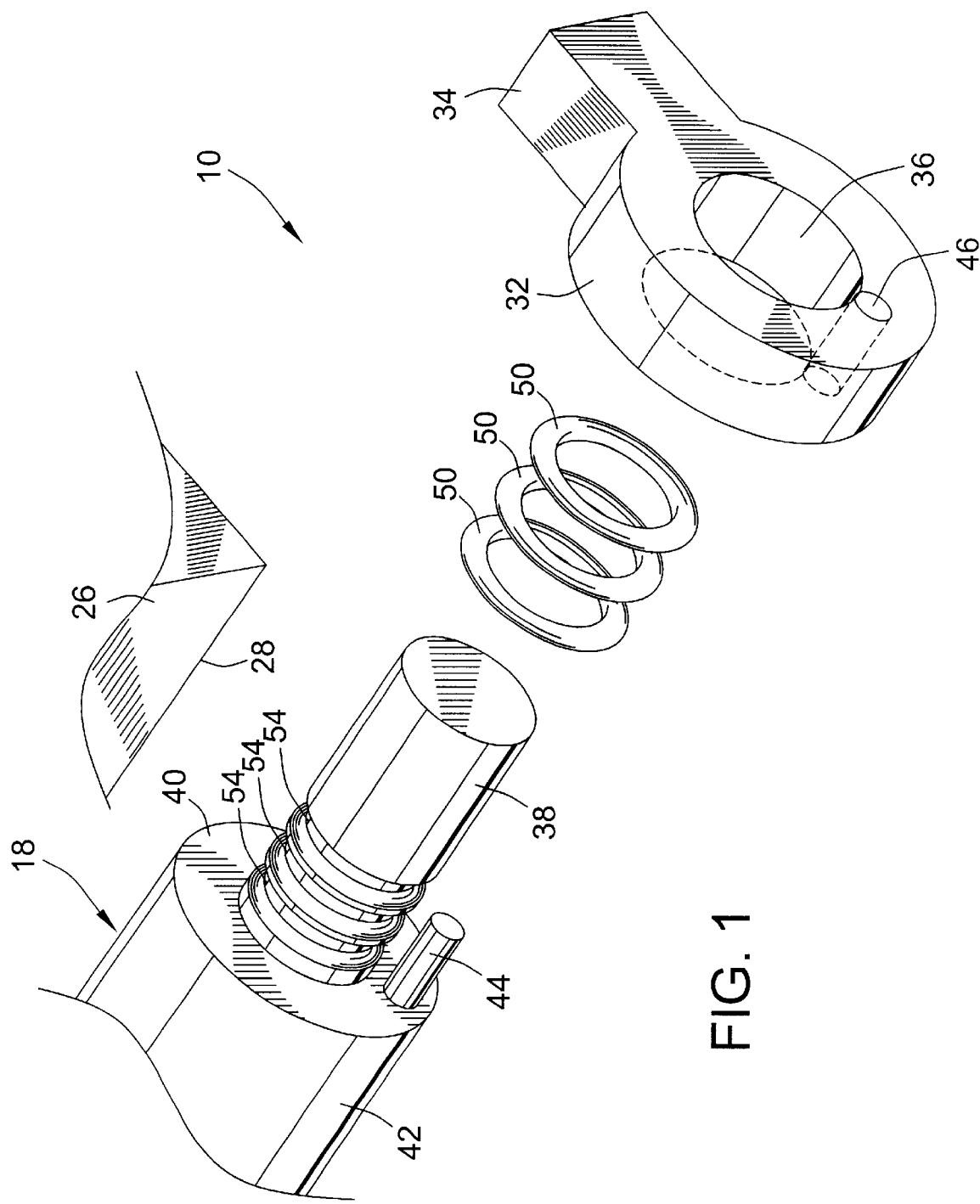
FIG. 1 is an enlarged isometric assembly view of a shock absorber mechanism for a rotary actuator, in accordance with a preferred embodiment of the present invention.
Figure 2:
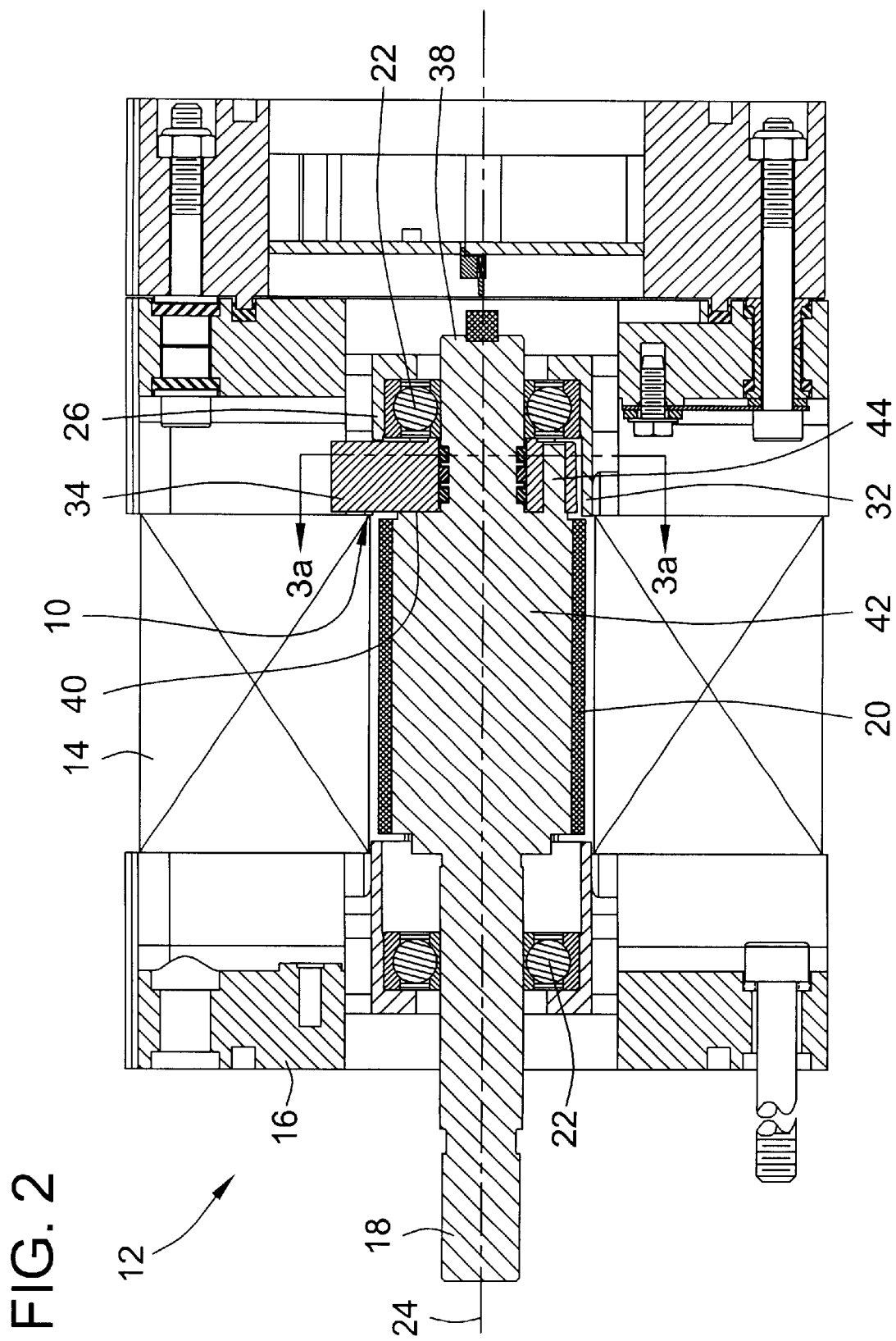
FIG. 2 is a cross section of a rotary actuator incorporating the shock absorber illustrated in FIG. 1.

For purposes of illustration, and referring to FIGS. 1 and 2, a preferred embodiment of the present invention is illustrated as a shock absorber mechanism 10 incorporated into a rotary actuator 12. The rotary actuator 12 is illustrated as the electrical type. However, the shock absorber mechanism 10 may also be incorporated in a pneumatic, hydraulic or other similar alternative powered rotary actuator which similarly has a stator and a rotor. An electrical rotary actuator 12 is characterized by the fact that it has a lamination stack/wire coils 14 secured within a housing 16 for the stator and an output shaft 18 having permanent magnets 20 for the rotor. The shaft 18 is journalled in spaced apart radial bearing sets 22 for rotation about an axis 24. As will be described further below, the particular rotary actuator 12 disclosed herein is of the variable position type adapted to rotate the shaft 18 between two angular positions (and position the shaft in discrete positions therebetween if desired).

In the disclosed embodiment, the maximum rotation of the actuator is controlled by a stop mechanism located at one end of the shaft. The stop mechanism comprises a stationary portion which comprises a bell portion 26 of the housing 16 that defines two angularly spaced stop surfaces 28, 30; and movable portion comprising a collar 32 including a stop tab 34 that has an oscillating travel path between the stop surfaces 28, 30. The collar 32 includes a central bore 36 that receives a smaller diameter section 38 of the shaft 18. The shaft 18 includes a central larger diameter section 42 joined to the smaller diameter section 38 by a radially planar juncture that provides a support shoulder 40. The collar 32 is axially retained by and sandwiched between the bearing set 22 and the shoulder 40. The collar 32 is radially retained to the shaft 18 by a pin 44 that is offset from the central axis 24 such that the collar 32 and shaft 18 rotate in unison. In the disclosed embodiment, the pin 44 is integrally provided by the shaft 18 and projects axially from the shoulder 40. The shoulder 40 provides the support structure for the pin 44. The pin 44 is closely received and slidably engages a cylindrical hole 46 formed in the collar 32 on the opposite side of the stop tab 34 (180° therefrom) to provide a fixed pivot joint or hinge. In alternative embodiments, the pin may also project outward from the collar and be received in a formed hole in the shaft, or alternatively be a separate part such as a shoulder bolt fastener, a cylindrical pin press fit into a formed axial hole in the shaft or other appropriate structure.

The stop tab 34 stops rotation of the shaft 18 when it strikes either of two stop surfaces 28, 30. As such, the shaft 18 can rotate a partial rotation between two angular positions determined by the angular spacing of the stop surfaces 28, 30 and the radial thickness of the stop tab 34. In rotary actuators where the shock absorber mechanism 10 is desired, shaft rotation is typically limited to between 35° and 300° degrees.

In accordance with the present invention, the shock absorber mechanism 10 reduces impact force when the stop tab 34 strikes the stop surfaces 28, 30 as indicated by the progression indicated in FIGS. 3a–5a and 4b–5b. In the disclosed embodiment, the shock absorber mechanism 10 is made possible by an annular clearance gap 48 between the shaft 18 and the central opening or bore 36 of the collar 32. The clearance gap 48 allows the collar 32 to pivot relative to the shaft 18 about the pivot joint provided by the pin 44. At least one resilient member in the form of three resilient o-rings 50 are arranged in the annular clearance gap 48 for the purpose of counteracting the pivoting movement. The o-rings 50 are supported by the shaft 18 and compress to absorb the impact force. When the collar 32 is mounted over the shaft 18, the o-rings 50 are slightly compressed by the inner diameter of the collar bore 36 which also centers the collar bore 36 diametric or coaxial about the shaft 18.

In operation, the lamination stack/wire coils 14 are energized which drives the shaft 18 and in turn the collar 32 in unison due to the pin 44. At the end of the rotating movement, the collar stop tab 34 strikes one of the stop surfaces 28, 30 for quick and accurate stopping. However, not all of the impact is absorbed at once, as the collar 32 pivots relative to the shaft 18 and the o-rings 50 compress between the shaft 18 and collar 32, thereby absorbing the impact. The resilient o-rings 50 also act as a spring and return the collar 32 to the diametric or coaxial position relative to the shaft 18 once the stop tab 34 is released from the stop surface 28, 30.

The pivoting movement of the collar 32 relative to the shaft 18 is also controlled and limited by the selectively sizing the radial thickness of the annular gap 48 (e.g., the difference between diameters of bore 36 and smaller diameter shaft section 38). To have adequate accuracy while achieving acceptable impact reduction for most actuator applications, this radial clearance or thickness is preferably between 0.1 and 0.5 millimeters. The shaft 18 defines limit surfaces 52 (namely, line/point on outer diameter of shaft that is generally perpendicular to the imaginary line between stop tab and pin) which engage the collar 32 after a predetermined and limited amount of pivoting movement of the collar 32 relative to the shaft 18, thereby setting the maximum angular distortion between the shaft 18 and the collar 32 (e.g. maximum angular distortion is the angular difference between the FIGS. 4a and 5a). To have adequate accuracy while achieving acceptable impact reduction for most actuator applications, the maximum angular distortion (or shaft over-travel) is between 0.25° and 5° degrees. By controlling and limiting the pivoting movement, accuracy of the rotary actuator 12 is not sacrificed.

The maximum compression and deformation of the o-rings 50 during each impact incident is also controlled by arranging the o-rings 50 in annular grooves 54 on the smaller section 38 of the shaft 18. The annular grooves 54 serve to retain the o-rings 50 but also are of sufficient size to provide sufficient space for the o-rings 50 to expand when compressed to thereby allow metal to metal contact between the collar 32 and the shaft 18 as indicated in FIGS. 5a and 5b. The collar 32 thus bottoms out on the shaft 18 after a predetermined amount of pivoting. By controlling maximum o-ring compression, reliability of the shock absorber mechanism is increased.

Although the above disclosed embodiment is preferred for reasons of small compact size, simplicity, reliability, practicality, ease of assembly, and cost reasons, it will be appreciated that there could be other less preferred embodiments of the invention. Such possibilities will now be briefly described. One possibility would be to provide a second clearance gap between the pin 44 and the cylindrical hole 46 and arrange a second resilient member at that location as well (in which the pivot joint would be between pin and axis). According to another possibility, the pivot joint could also be moved to the center of the axis 24 with a close slidably engaging fit between collar bore 36 and the smaller diameter section 38, in which the clearance gap would be located between the pin 44 and the cylindrical hole 46 with the o-rings or other resilient member therebetween. Certain broader claims appended hereto are meant to encompass these and other possibilities.

Further details of other; aspects of the disclosed electrical rotary actuator can be had to U.S. application Ser. Nos. 09/793,356, 09/793,225, and 09/795,045 assigned to the present assignee and filed on the same date as the instant application, the entire disclosures of which are hereby incorporated by reference.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A shock absorber mechanism for a shaft having an axis of rotation, comprising:

a shoulder on the shaft;

a collar having an opening receiving the shaft, a gap being defined between the opening and the shaft;

a pin offset from the axis pivotally connecting the collar to the shoulder such that the collar pivots relative to the shaft about the pin;

at least one resilient member arranged in the gap engaging the collar and the shaft;

wherein the collar and the shaft are adapted to rotate in unison, the at least one resilient member compressing; when one of the collar and the shaft accelerates relative to the other one of the collar and the shaft, thereby to provide shock absorption.

2. The shock absorber of claim 1 wherein the collar includes an radially outwardly projecting stop tab adapted to contact a stop surface, the collar pivoting about the pin when the stop tab engages the stop surface.

3. The shock absorber of claim 2 wherein the stop tab has a oscillating travel path between two fixed stop surfaces, the two stop surfaces being located at different angular positions about the axis.

4. The shock absorber of claim 1 wherein the resilient member comprises at least one resilient o-ring seated in at least one corresponding annular groove in a selected one of the shaft and the collar, the gap closing with the collar contacting the shaft at a predetermined compression of the resilient o-ring.

5. The shock absorber of claim 4 wherein the size of the gap and position of the relative to the axis are selected to limit angular distortion between the shaft and the collar to a selected maximum of between 0.25 and 5 degrees.

6. The shock absorber of claim 1 wherein the shoulder is a radially planar annular juncture between larger and smaller diameter sections of the shaft.

7. A rotary actuator including a shock absorber mechanism, comprising:
a stator;
a rotor supported for rotation by the stator, the stator adapted to rotate the rotor about an axis, the rotor including a shaft aligned on the axis;
a shoulder on the shaft,
a collar having an opening receiving the shaft, a gap being defined between the opening and the shaft;
a pin offset from the axis pivotally connecting the collar to the shoulder such that the collar pivots relative to the shaft about the pin;
at least one resilient member arranged in the gap engaging the collar and the shaft;
wherein the collar and the shaft are adapted to rotate in unison, the at least one resilient member compressing when one of the collar and the shaft accelerates relative to the other one of the collar and the shaft, thereby to provide shock absorption.

8. The shock absorber of claim 7 wherein the collar includes an radially outwardly projecting stop tab adapted to contact a stop surface, the collar pivoting about the pin when the stop tab engages the stop surface.

9. The shock absorber of claim 8 wherein the stop tab has a oscillating travel path between two fixed stop surfaces, the two stop surfaces being located at different angular positions about the axis.

10. The shock absorber of claim 7 wherein the resilient member comprises at least one resilient o-ring seated in at least one corresponding annular groove in a selected one of the shaft and the collar, the gap closing with the collar contacting the shaft at a predetermined compression of the resilient o-ring.

11. The shock absorber of claim 10 wherein the size of the gap and position of the pin relative to the axis are selected to limit angular distortion between the shaft and the collar to a selected maximum of 0.25 and 5 degrees.

12. The shock absorber of claim 7 wherein the shoulder is a radially planar annular juncture between larger and smaller diameter sections of the shaft.

13. The rotary actuator of claim 7 wherein the stator includes a lamination stack and electrical windings, and the rotor has permanent magnets, whereby the rotary actuator is electrical.

14. A rotary actuator including a shock absorber mechanism and having a rotational output on an axis, comprising:

a stator comprising a housing, the housing carrying bearings and providing first and second stop surfaces arranged at different angular positions relative to the axis;
a rotor comprising a shaft aligned on the axis and journalled in the bearings, the shaft having a large diameter section of a first diameter and a small diameter section of a second diameter smaller that said first diameter; the first and second diameters joined by an annular shoulder section;
a collar having a bore receiving the small diameter section, the collar being seated against the annular shoulder, an annular gap being defined between the bore and the smaller diameter section, the collar having a mechanical stop tab projecting radially outward for engaging the first and second stop surfaces;
a pin connecting the collar and the shoulder to provide a pivot joint;
at least one resilient o-ring disposed in the annular gap between the collar and the shaft; and
wherein the stator is operable to rotate the rotor between first and second angular positions, the stop tab engaging the first stop surface to define the first angular position and engaging the second stop surface to define the second angular position, the collar pivoting about the pivot joint and compressing the resilient o-ring when the stop tab engages either of the first and second stop surfaces to thereby reduce impact force.

15. The rotary actuator of claim 14 wherein one of the shaft and the collar comprises at least one annular groove in which the at least one o-ring is seated, the annular gap closing with the collar contacting the shaft to stop further pivoting about the pivot joint when the stop tab engages either of the first and second stop surfaces and at a predetermined compression of the resilient o-ring.

16. The shock absorber of claim 15 wherein the size of the gap and position of the pin relative to the axis are selected to limit angular distortion between the shaft and the collar to a selected maximum of between 0.25 and 5 degrees when the stop tab engages either of the first and second stop surfaces.

17. The rotary actuator of claim 16 wherein the radial width of the annular gap is between 0.1 and 0.5 millimeters.

18. The rotary actuator of claim 14 wherein the at least one resilient o-ring comprises at least two resilient o-rings, the number of o-rings being selected to provide a predetermined impact reduction characteristic.

19. The rotary actuator of claim 14 wherein the pin is integrally formed with the shoulder, the collar defining a cylindrical hole slidably receiving the pin.

20. The rotary actuator of claim 14 wherein the stop tab has an oscillating travel path between stop surfaces that is between 35 and 300 degrees.

21. The rotary actuator of claim 14 wherein the shoulder is a radially planar juncture between the smaller and larger diameter sections, the collar being sandwiched between a set of the bearings and the radially planar juncture for axial retention.

22. The rotary actuator of claim 14 wherein the stator includes a lamination stack and electrical windings, and the rotor has permanent magnets, whereby the rotary actuator is electrical.

23. A rotary actuator including a shock absorber mechanism and having a rotational output on an axis, comprising:
a stator comprising a housing, the housing carrying bearings and providing first and second stops arranged at different angular positions relative to the axis;

a rotor journalled in the bearings for rotation about the axis, the rotor providing the shock absorber mechanism comprising a shaft portion and a collar portion, the collar portion having an opening receiving the shaft portion, the shock absorber mechanism further including a stop tab positioned radially between the stop surfaces for oscillation therebetween;

a pin radially retaining the collar portion to the shaft portion at a location offset from the axis such that the collar portion and shaft portion rotate in unison;

a pivot joint between the collar portion and the shaft portion, the collar portion having a limited range of pivoting movement relative to the shaft portion about the pivot joint; and at least one resilient member supported by the shaft arranged to counteract the pivoting movement and thereby absorb impact when the stop tab engages one of the stop surfaces during rotation.

24. The rotary actuator of claim 23 wherein the shaft portion defines limit surfaces for snubbing the pivoting movement, the collar portion engaging the limit surfaces at a predetermined force stored in the at least one resilient member.

25. The rotary actuator of claim 24 wherein the limit surfaces control the pivoting movement of the collar portion to a maximum of between 0.25 degrees and 5 degrees relative to the shaft when the collar portion engages one of the stop surfaces.

26. The rotary actuator of claim 24 wherein the pivot joint is at the pin, further comprising a clearance gap between the opening of the collar portion and the shaft portion.

27. A shock absorber mechanism for a shaft having an axis of rotation, comprising:

a collar portion having an opening slidably receiving a shaft portion;

a pin radially retaining the collar portion to the shaft portion at a location offset from the axis such that the collar portion and shaft portion rotate in unison;

a pivot joint between the collar portion and the shaft portion, the collar portion having a limited range of pivoting movement relative to the shaft portion about the pivot joint; and at least one resilient member supported by the shaft arranged to counteract the pivoting movement and thereby absorb impact when the stop tab engages one of the stop surfaces during rotation.

28. The rotary actuator of claim 27 wherein the shaft portion defines limit surfaces for snubbing the pivoting movement, the collar portion engaging the limit surfaces at a predetermined force stored in the at least one resilient member.

29. The rotary actuator of claim 28 wherein the limit surfaces control the pivoting movement of the collar portion to a maximum of between 0.25 degrees and 5 degrees relative to the shaft when the collar portion engages one of the stop surfaces.

30. The rotary actuator of claim 27 further comprising a clearance gap between the opening of the collar portion and the shaft portion at least one resilient member arranged in the clearance gap such that the collar portion pivots about the pin through expansion and contraction in the at least one resilient member.

31. The rotary actuator of claim 30 further comprising a second clearance gap between the pin and the collar portion, at least one second resilient member arranged in the second clearance gap such that the collar portion also pivots about the shaft through expansion and contraction in the at least one second resilient member.

32. The rotary actuator of claim 27 further comprising a clearance gap between the pin and the collar portion, the at least one resilient member arranged in the clearance gap such that the collar portion pivots about the shaft through expansion and contraction in the at least one resilient member.

* * * * *

UNITED STATES PATENT AND TRADEMARK OFFICE
CERTIFICATE OF CORRECTION

PATENT NO.    : 6,467,587 B2
DATED         : October 22, 2002
INVENTOR(S)   : George Sanchez et al.

It is certified that error appears in the above-identified patent and that said Letters Patent is hereby corrected as shown below:

Column 4,
Line 65, after "compressing", delete ";"

Signed and Sealed this

Twenty-fifth Day of March, 2003

JAMES E. ROGAN
*Director of the United States Patent and Trademark Office*